United States Patent [19]
Balwe et al.

[11] 3,817,963
[45] June 18, 1974

[54] SUSPENSION POLYMERIZATION OF VINYL CHLORIDE

[75] Inventors: Thomas Balwe; Johann Bauer; Franz Schleberger, all of Burghausen, Germany

[73] Assignee: Wacker Chemie GmbH, Munich, Germany

[22] Filed: Oct. 30, 1972

[21] Appl. No.: 301,879

[30] Foreign Application Priority Data
July 11, 1972  Germany............................ 2234038

[52] U.S. Cl. .......................... 260/92.8 W, 260/17 R
[51] Int. Cl. ............................................... C08f 1/11
[58] Field of Search ..................... 260/92.8 W, 17 R

[56] References Cited
UNITED STATES PATENTS
3,701,742  10/1972  Richardson et al. ............... 260/17 R
3,706,705  12/1972  Koyenagi ...................... 260/78.5 CL Primary Examiner—Joseph L. Schofer
Assistant Examiner—J. Kight
Attorney, Agent, or Firm—Nelson Littell

[57] ABSTRACT

An improvement in the process for polymerization of vinyl chloride in the aqueous phase in the presence of oil-soluble, free-radical-forming polymerization catalysts, protective colloids and optionally other polymerization aids which is characterized by use of a protective colloid combination consisting of hydroxyethyl cellulose and aminoethylhydroxypropyl cellulose; as well as the polyvinyl chloride produced by the process.

6 Claims, No Drawings

SUSPENSION POLYMERIZATION OF VINYL CHLORIDE

THE PRIOR ART

Suspension polymerized polyvinyl chloride is produced on a large scale without necessity of agglomerization of powders and subsequent granulation. In one method of further processing of suspension polymerized polyvinyl chloride powder, the so-called plasticized processing, the PVC powder is so mixed with plasticizers, stabilizers, lubricants and fillers, if necessary, that a pourable powder is obtained (dry blend). The plasticizer is completely absorbed by the PVC particles. Of great interest in this processing method is, on the one hand, that the absorption of the plasticizer is effected very rapidly which depends primarily on the porosity of the particles, and on the other hand, that the mixture had a very high bulk weight which depends primarily on the bulk weight of the raw material. A rapid absorption of the plasticizer results, for example, in short cycle times, which is of great economical interest in the continuous processes used today. A high bulk weight of the mixture results, on the other hand, in a great output of the processing machines, which is naturally of just as great importance.

Furthermore, a high bulk weight and a high porosity are also of great importance in hard processing (without plasticizers), since the bulk weight determines the output of the processing machines and the porosity of the grain determines the gelling rate, and thus likewise the output rate.

According to the present state of the art, it is possible to produce a coarse-grained, and thus easily pouring, suspension-PVC with a high porosity of the particles. The disadvantage of these products, however, is that they have a low bulk weight. An increasing porosity of the PVC grain results necessarily according to the state of the art in a reduction of the density and thus of the bulk weight.

Such a suspension-PVC of high porosity but low bulk weight is obtained, for example, by using hydroxypropyl cellulose or its derivatives as a suspension aid in the polymerization according to German published application DOS 1,795,276.

OBJECTS OF THE INVENTION

An object of the present invention is to provide a polymerization method which leads to a suspension-PVC which has both a porous structure (good plasticizer absorption) and a high bulk weight (over 0.50 g/ml).

A further object of the present invention is to provide in the process for polymerization of vinyl chloride comprising heating a suspension of vinyl chloride in an aqueous phase in the presence of oil-soluble, free-radical forming polymerization catalysts, protective colloids and, optionally, other polymerization aids for a time and temperature sufficient to effect polymerization and recovering polyvinyl chloride powder, the improvement which consists in utilizing a protective colloid combination consisting of hydroxyethyl cellulose and aminoethyl-hydroxypropyl cellulose as said protective colloid.

Another object of the invention is to obtain suspension-polymerized polyvinyl chloride having a porous structure and a high bulk weight as produced by the above process.

These and other object of the invention will become more apparent as the description thereof proceeds.

DESCRIPTION OF THE INVENTION

The subject of the invention is a method for the polymerization of vinyl chloride in the aqueous phase in the presence of oil-soluble, free-radical-forming polymerization catalysts, protective colloids and, if necessary, other polymerization aids, characterized in that a protective colloid combination, consisting of hydroxyethyl cellulose and aminoethyl-hydroxypropyl cellulose is used as the protective colloids.

Surprisingly it was found that, by using the protective colloid combination according to the invention, a PVC granule is obtained which shows great porosity and which also has a high bulk weight.

The total amount of the protective colloid used is from 0.005 percent to 0.5 percent by weight, based on the weight of water utilized. Preferably, the protective colloid combination of the invention consists of from 50 percent to 95 percent by weight, preferably from 70 percent to 92 percent by weight, of hydroxyethyl cellulose and from 5 percent to 50 percent by weight, preferably from 8 percent to 30 percent by weight of aminoethyl-hydroxypropyl cellulose. The molar substitution of the hydroxyethyl cellulose, or amount in mols of the hydroxyethyl substituted on cellulose generally has a value between 1 and 4, preferably between 1 and 3. The aminoethyl-hydroxypropyl cellulose mostly has a molar substitution of aminoethyl groups of from 0.01 to 3, preferably from 0.05 to 1, and of hydroxypropyl groups of at least 2, preferably from 3 to 5. The viscosity of the hydroxyethyl cellulose in 2 percent aqueous solution at 20°C is, in general, between 150 and 300 cp, that of the aminoethyl-hydroxypropyl cellulose is between 50 and 700 cp.

The catalysts generally employed in the suspension polymerization of vinyl chloride can be used as oil-soluble free-radical-forming polymerization catalysts. Examples are: diaryl peroxides and diacyl peroxides, for example, diacetyl peroxide, acetylbenzoyl peroxide, dilauroyl peroxide, dibenzoyl peroxide, bis-2,4-dichlorobenzyl peroxide; dialkyl peroxides, for example, di-t. butyl peroxide, alkyl alkanoate per esters, for example, tert. propyl peracetate, tert. butyl peracetate, tert. butyl peroctate, tert. butyl perpivalate; dialkyl peroxy dicarbonates, for example, diisopropyl peroxy dicarbonate, dicyclohexyl peroxy dicarbonate, diethylhexyl peroxy dicarbonate, di-t-butylcyclohexyl peroxy dicarbonate, dicetyl peroxy dicarbonate; mixed anhydrides of organic sulfo peracids and organic acids, for example, acetyl cyclohexyl-sulfonyl peroxide, as well as aza compounds known to be polymerization catalysts, for example, azoisobutyric acid dinitrile; and boronalkyls; or mixtures of the mentioned catalysts, for example, dialkyl peroxy dicarbonates and dilauryl peroxide or acetyl cyclohexyl-sulfonyl peroxide and azoisobutyric acid dinitrile or acetyl cyclohexyl-sulfonyl peroxide and tert. butyl perpivalate. The catalysts are used generally in amounts of from 0.001 percent to 3 percent by weight, preferably from 0.01 percent to 0.3 percent by weight, based on the weight of the monomer. They can be charged with the monomers or be added to during the polymerization.

If necessary, additional emulsifiers can be used, for example, non-ionic emulsifiers, for example, higher fatty acid esters of polyhydric alcohols, higher fatty alcohol-polyoxyalkyleneglycol ethers, polyoxypropylene glycol-ethylene oxide addition products or anionic emulsifiers, for example, alkyl benzene sulfonates, salts of sulfuric acid esters of higher fatty alcohols, etc.

Furthermore, the usual aids can be utilized or dosed into the polymerization mixture, for example, buffer compounds such as sodium bicarbonate, soda, calcium carbonate, alkali metal acetates, alkali metal phosphates, or molecular weight regulators, such as aliphatic aldehydes with two to four carbon atoms, chlorinated hydrocarbons, such as di- and trichloroethylene, chloroform, methylene chloride, and mercaptans.

The polymerization is carried out in closed vessels in the aqueous phase. The pressure during the polymerization is generally between 7 and 12 atm. The polymerization temperature is mostly between 40°C and 65°C. The reaction vessel contains a stirring device and preferably baffle plates or current disturbers in order to ensure an intensive stirring effect. As a rule, jacketed autoclaves are used to ensure intensive cooling. The time of polymerization is frequently between 6 and 15 hours.

The monomer/water ratio is not of decisive importance. Mostly the amount of monomers is from 10 percent to 60 percent by weight of the total amount of water and monomers.

The following examples are illustrative of the practice of the invention without being deemed limitative.

EXAMPLES

The parts indicated in the examples are parts by weight.

As a measure for the porosity of the granules, the plasticizer absorption capacity was determined as follows: 5 gm of the PVC to be tested were mixed by means of a spatula with dioctyl phthalate until the mixture on slight pressure between filter paper leaves plasticizer traces. The amount of plasticizer supplied from a burette is measured. The data are in cc of the dioctyl phthalate used per 5 gm of PVC.

The bulk weight of the respective products was determined according to DIN 53 468.

EXAMPLE 1

The following ingredients were charged in a stirring autoclave:
196 parts of water
0.24 parts of hydroxyethyl cellulose, 250 cp (2 percent solution at 20°C), tradename "Natrosol 250 G"
0.06 parts of dicetyl peroxy-dicarbonate.

Subsequently the autoclave was closed and evacuated to about 20 mm Hg. Finally, 120 parts of vinyl chloride were added, and the autoclave was heated to 54°C. Under constant stirring and at a constant temperature of 54°C, the polymerization was continued for 9 hours until 85 percent of the monomer had been reacted, and the remaining monomer was distilled off. The polymer obtained was filtered off, dried and its density and plasticizer absorption were determined. The results are compiled in Table I.

EXAMPLE 2

Example 1 was repeated, but instead of hydroxyethyl cellulose, 0.24 parts of aminoethyl-hydroxypropyl cellulose, 150 cp (2 percent solution at 20°C) tradename "Klucel 6 G" was utilized. The properties of the polymer obtained are given in Table I.

EXAMPLE 3

Example 1 was repeated, using a protective colloid combination of 0.216 parts of the hydroxyethyl cellulose and 0.024 parts of the aminoethyl-hydroxypropyl cellulose (9:1). The properties of the polymer obtained are given in Table I.

EXAMPLE 4

Example 1 was repeated using a protective colloid combination of 0.192 parts of hydroxyethyl cellulose and 0.048 parts of aminoethyl-hydroxypropyl cellulose (8:2). The properties of the polymer obtained are given in Table I.

EXAMPLE 5

Example 1 was repeated using a protective colloid combination of 0.168 parts of hydroxyethyl cellulose and 0.072 parts of aminoethyl-hydroxypropyl cellulose (7:3). The properties of the polymer obtained are given in Table I.

EXAMPLE 6

Example 1 was repeated using a protective colloid combination of 0.144 parts of hydroxyethyl cellulose and 0.096 parts of aminoethyl-hydroxypropyl cellulose (6:4). The properties of the polymer obtained are given in Table I.

TABLE I

| Example No. | Parts HEC* | Parts AEHPC** | Bulk Weight gm/ml | Plasticizer Absorption ml/5 gm |
|---|---|---|---|---|
| 1 | 0.24 | — | 0.55 | 0.9 |
| 2 | — | 0.24 | 0.47 | 1.5 |
| 3 | 0.216 | 0.024 | 0.58 | 1.4 |
| 4 | 0.192 | 0.048 | 0.56 | 1.4 |
| 5 | 0.168 | 0.072 | 0.54 | 2.0 |
| 6 | 0.144 | 0.096 | 0.53 | 1.5 |

*HEC - hydroxyethyl cellulose
**AEHPC - aminoethyl-hydroxypropyl cellulose

These results demonstrate that the protective colloids combination of the invention of hydroxyethyl cellulose and aminoethyl-hydroxypropyl cellulose give, on supension polymerization, a polyvinly chloride granule which has a bulk weight of over 0.50 gm/ml and, at the same time, a highly porous structure (plasticizer absorption of over 1.3 ml/5 gm). It can readily be seen that this result was completely unpredictable from the results obtained using either hydroxyethyl cellulose alone, which gave a PVC granule with a high bulk weight and a low plasticizer absorption, or aminoethyl-hydroxypropyl cellulose alone, which gave a PVC granule with a low bulk weight and an average plasticizer absorption. While protective colloids combinations of from 50 percent to 95 percent of hydroxyethyl cellulose and from 5 percent to 50 percent of aminoethyl-hydroxypropyl cellulose would be predicted to give a PVC granule with a bulk weight in excess of 0.50 gm/ml, the predicted amount of plasticizer absorption would be from 0.93 to 1.2 ml/5 gm. The protective colloids combination of the invention thus clearly shows an unpredictable synergistic effect.

The preceding specific embodiments are illustrative of the practice of the invention. It is to be understood, however, that other expedients known to those skilled in the art or described herein, may be employed without departing from the spirit of the invention or the scope of the appended claims.

We claim:

1. In the process for polymerization of vinyl chloride comprising heating a suspension of vinyl chloride in an aqueous phase in the presence of oil-soluble, free-radical-forming polymerization catalysts, protective colloids and, optionally, other polymerization aids for a time and temperature sufficient to effect polymerization and recovering polyvinyl chloride powder, the improvement which consists in utilizing a protective colloid combination consisting of from 50 percent to 95 percent by weight of hydroxyethyl cellulose and from 5 percent to 50 percent by weight of aminoethyl-hydroxypropyl cellulose as said protective colloids.

2. The process of claim 1 wherein said protective colloid combination consists of from 70 percent to 92 percent by weight of hydroxyethyl cellulose and from 8 percent to 30 percent by weight of aminoethyl-hydroxypropyl cellulose.

3. The process of claim 1 wherein said hydroxyethyl cellulose has a molar substitution of between 1 and 4.

4. The process of claim 1 wherein said hydroxyethyl cellulose has a molar substitution of between 1 and 3.

5. The process of claim 1 wherein said aminoethyl-hydroxypropyl cellulose has a molar substitution of aminoethyl groups of between 0.01 and 3 and a molar substitution of hydroxypropyl groups of at least 2.

6. The process of claim 1 wherein said aminoethyl-hydroxypropyl cellulose has a molar substitution of aminoethyl groups of between 0.05 and 1 and a molar substitution of hydroxypropyl groups of between 3 and 5.

* * * * *